(12) United States Patent
Hoye

(10) Patent No.: US 11,096,769 B1
(45) Date of Patent: Aug. 24, 2021

(54) PROCESS AND DEVICE FOR DENTAL MOUTH CLEANING

(71) Applicant: Mary Ellen Hoye, Homer Glen, IL (US)

(72) Inventor: Mary Ellen Hoye, Homer Glen, IL (US)

( * ) Notice: Subject to any disclaimer, the term of this patent is extended or adjusted under 35 U.S.C. 154(b) by 223 days.

(21) Appl. No.: 16/375,766

(22) Filed: Apr. 4, 2019

(51) Int. Cl.
*A61C 17/28* (2006.01)
*B08B 1/04* (2006.01)
*B08B 1/00* (2006.01)

(52) U.S. Cl.
CPC .............. *A61C 17/28* (2013.01); *B08B 1/003* (2013.01); *B08B 1/04* (2013.01)

(58) Field of Classification Search
CPC ... A46B 13/04; A46B 15/0081; A61C 17/227; A61C 17/28; B08B 1/003; B08B 1/04
See application file for complete search history.

(56) References Cited

U.S. PATENT DOCUMENTS

| 3,892,004 A * | 7/1975 | Downes ..................... A47L 4/02 15/102 |
| 6,062,229 A * | 5/2000 | Kandratavich ...... A45D 29/007 132/73 |
| 6,131,228 A * | 10/2000 | Chen .......................... A46B 9/04 15/160 |
| 2008/0176183 A1* | 7/2008 | Gatzemeyer ....... A46B 15/0075 433/82 |

* cited by examiner

*Primary Examiner* — Randall E Chin
(74) *Attorney, Agent, or Firm* — Clifford H. Kraft

(57) ABSTRACT

A specialized battery powered device that has a rotating sponge tip that can dispense mouthwash on demand while in use. The sponge tip can be rotated by a battery-powered motor at different RPM. The present invention also includes a step-by-step process for using the device and achieving an extremely clean mouth.

13 Claims, 1 Drawing Sheet

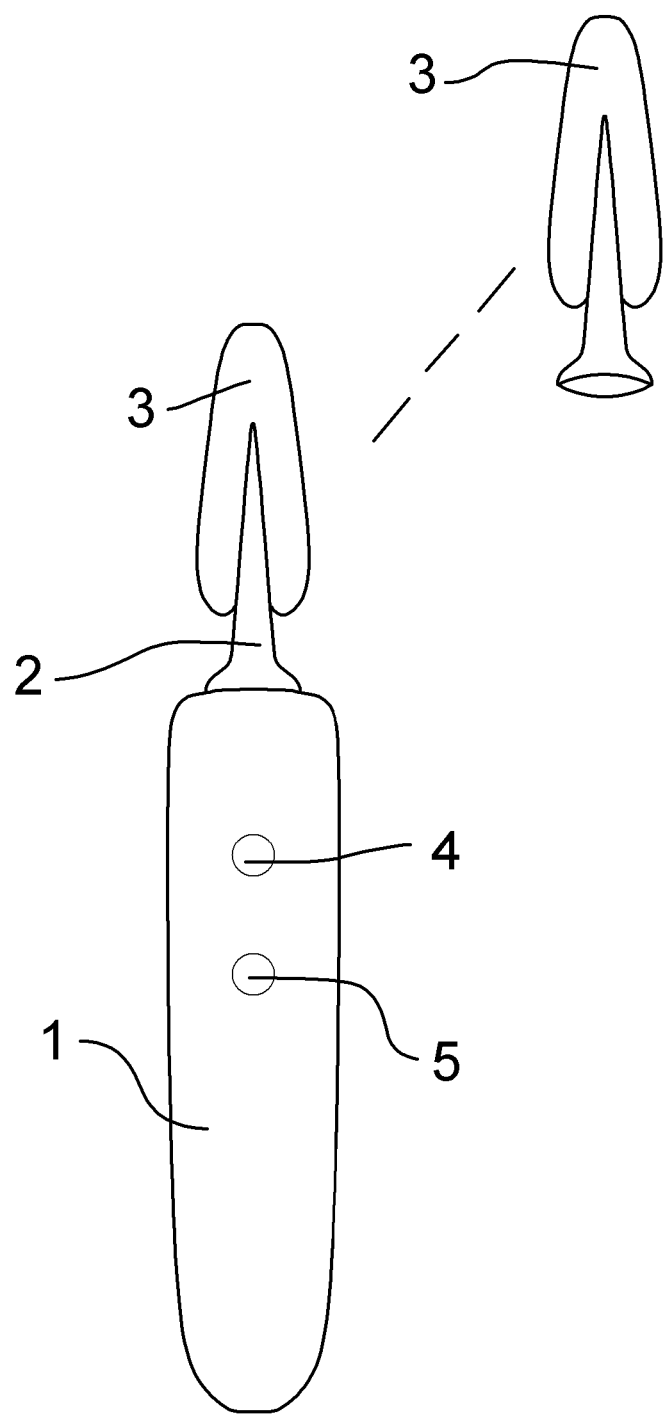

PROCESS AND DEVICE FOR DENTAL MOUTH CLEANING

BACKGROUND

Field of the Invention

The present invention relates generally to dental apparatus and techniques and more particularly to a process and device for dental mouth cleaning.

DESCRIPTION OF THE PROBLEM SOLVED

After eating, numerous food particles remain in the mouth either stuck between the teeth, or in one of the many recesses of the mouth. While dental picks, dental floss, tooth brushes and the like clean out some of this waste, many times, food particles remain in the mouth recesses. Bacteria and other odor causing particles linger in various places in the mouth because there are so many hiding places such as the vestibules between the cheek and gum tissue, under the tongue, in the grooves of the tongue and the palate. It would be advantageous to have a device and a cleaning technique that would completely clean the mouth that could easily be used by a dentist or by an individual.

SUMMARY OF THE INVENTION

The present invention relates to a specialized battery powered device that has a rotating sponge tip that can dispense mouthwash on demand while in use. The sponge tip can be rotated by a battery-powered motor at different RPM. The present invention also includes a step-by-step process for using the device and achieving an extremely clean mouth.

DESCRIPTION OF THE FIGURE

Attention is now directed to a FIGURE that illustrates features of the present invention.

FIG. 1 shows a top view of an embodiment of the rotating tip device.

At least one FIGURE has been presented to aid in understanding the present invention. The scope of the present invention is not limited to what is shown in the FIGURE.

DESCRIPTION OF THE PREFERRED EMBODIMENT

FIG. 1 shows an embodiment of the device of the present invention. The device has a body 1 that optionally holds a container of oral-cleaning solution, a small electric motor that can be a direct current (DC) motor and a battery. The battery can optionally be rechargeable. A removable tip 2 has sponge-like part 3, and can be rotated at different speeds (RPM) determined by a control 4 on the side of the body 1 (or in some embodiment it can run at a predetermined fixed speed). An optional dispense button, also on the body 1, can dispense mouth wash when pressed, or the tip 3 can be dipped or otherwise saturated with mouth wash. The optional internal mouthwash container can be refilled through a refill port on the body 1. Tips for the device can come in different sizes and shapes and are disposable. An example tip 2 is shown in FIG. 1. An off-on button 5 can also be located on the body 1. The device is used to clean recesses in the mouth.

The cleaning process is applied after completing normal brushing and flossing as follows:

The process uses the device described above with a sponge or gauze tip that has a soft yet roughened surface to pull out the bacteria and particles when rubbed against it. A mouthwash, oral cleaning solution or medicated rinse is dispensed by pressing the dispense button getting the tip wet or by spraying or dipping the tip.

The device is inserted behind the rear terminus of the upper jaw between the cheek and the gum tissue (behind the last tooth). The tip of the device is kept in the vestibule (touching both the cheek and the gum tissue) and with a scrubbing motion, it is moved forward toward the front of the mouth-under the upper lip, and continued along to the other side of the mouth to reach the position on the opposite side of the mouth across from the starting point. Then with the same scrubbing motion, the device is used to clean the palate extending back only as far as is comfortable.

Next, the same is done for the lower jaw. Using the same moistened tip, the device is started back behind the last tooth on one side of the mouth and used to scrub inside the vestibule of the gum and cheek while it is moved forward to the lip area. The motion is continued under the lower lip and back along the other side of the mouth to a point across from the starting point.

Then the user lifts the tongue to the roof of the mouth and the tip is inserted under the tongue cleaning the bottom of the tongue and the floor of the mouth on both sides. Finally, the user sticks the tongue out, and spreads the tongue to open any of the grooves. The same scrubbing action is used on the top of the tongue.

The scrubbing device, along with the method of use, provides a total cleaning of the mouth. The process leaves the user with a feeling refreshed with total mouth cleanliness.

In an alternative embodiment, the entire unit or the tip can be constructed to fit existing battery powered toothbrush systems. The tip may be made of sponge, gauze, terry cloth or fabric, and may be fabricated to fit existing battery powered toothbrush systems.

The present invention can be used at home or in a dental office. In the dental office, the device can take the form of an attachment for a slow speed hygiene hand-piece, or it can be a separate dental office unit.

The diameter the tip is approximately that of a baby finger. It is soft and can have some flexibility.

Several descriptions and illustrations have been presented to aid in understanding the present invention. One with skill in the art will realize that numerous changes and variations may be made without departing from the spirit of the invention. Each of these changes and variations is within the scope of the present invention.

I claim:

1. A process for total mouth cleaning comprising:
   placing a disposable sponge-like tip on a handheld device that rotates the tip at a predetermined or selectable speed, the handheld device being constructed to dispense an oral-cleaning solution into the tip upon pressing a dispense button on the device, the device having a variable speed electric motor and a battery;
   (a) cleaning the upper jaw by inserting the tip of the device between cheek and gum tissue behind a last upper tooth on a first side of the mouth, the tip being kept in a vestibule (touching both cheek and gum tissue) and with a scrubbing motion, moving the tip forward toward the front of the mouth under the upper lip;

(b) repeating step (a) on a second side of the mouth;
(c) cleaning the lower jaw by inserting the tip of the device between cheek and gum tissue behind a last lower tooth on the first side of the mouth, the tip being kept in the vestibule (touching both cheek and gum tissue) and with a scrubbing motion, moving the tip forward toward the front of the mouth under the lower lip;
(d) repeating step (c) to clean the second side of the mouth;
(e) cleaning the palate with a similar scrubbing motion extending back as far as is comfortable;
(f) having the user lift the tongue to roof of the mouth;
(g) inserting the tip of the device under the tongue cleaning the bottom of the tongue and the floor of the mouth on both sides;
(h) having the user stick the tongue out and spread the tongue, then applying a similar scrubbing action on the top of the tongue.

2. The process of claim 1 further comprising dispensing said oral-cleaning solution into the tip at each of steps (a), (b), (c), (d), (e), (g) and (h).

3. The process of claim 1 wherein the motor is a direct current DC motor.

4. The process of claim 1 wherein the oral-cleaning solution is mouthwash.

5. The process of claim 1 wherein the oral-cleaning solution is a medicated rinse.

6. The process of claim 1 wherein the battery is rechargeable.

7. A process and method for total mouth cleaning comprising:
placing a disposable sponge-like tip on a handheld device that rotates the tip at a predetermined or selectable speed, the handheld device being constructed to dispense an oral-cleaning solution into the tip upon pressing a dispense button on the device, the device having a variable speed electric motor and a battery;
(a) cleaning the upper jaw by inserting the tip of the device between cheek and gum tissue behind a last upper tooth on a first side of the mouth, the tip being kept in a vestibule (touching both cheek and gum tissue) and with a scrubbing motion, moving the tip forward toward the front of the mouth under the upper lip;
(b) repeating step (a) on a second side of the mouth
(c) cleaning the lower jaw by inserting the tip of the device between cheek and gum tissue behind a last lower tooth on the first side of the mouth, the tip being kept in the vestibule (touching both cheek and gum tissue) and with a scrubbing motion, moving the tip forward toward the front of the mouth under the lower lip;
(d) repeating step (c) to clean the second side of the mouth.

8. The process of claim 7 further comprising the step:
(e) cleaning the palate with a similar scrubbing motion extending back as far as is comfortable.

9. The process of claim 7 further comprising the steps:
(e) having the user lift the tongue to roof of the mouth;
(f) inserting the tip of the device under the tongue cleaning the bottom of the tongue and the floor of the mouth on both sides.

10. The process of claim 7 further comprising the step:
(e) having the user stick the tongue out and spread the tongue, then
applying a similar scrubbing action on the top of the tongue.

11. The process of claim 7 further comprising the step:
(e) cleaning the palate with a similar scrubbing motion extending back as far as is comfortable;
(f) having the user lift the tongue to roof of the mouth;
(g) inserting the tip of the device under the tongue cleaning the bottom of the tongue and the floor of the mouth on both sides.

12. The process of claim 7 further comprising the steps:
(e) cleaning the palate with a similar scrubbing motion extending back as far as is comfortable;
(f) having the user stick the tongue out and spread the tongue, then applying a similar scrubbing action on the top of the tongue.

13. The process of claim 7 further comprising the steps:
(e) having the user lift the tongue to roof of the mouth;
(f) inserting the tip of the device under the tongue cleaning the bottom of the tongue and the floor of the mouth on both sides;
(g) having the user stick the tongue out and spread the tongue, then applying a similar scrubbing action on the top of the tongue.

* * * * *